(12) United States Patent
Rølvåg

(10) Patent No.: US 9,163,687 B2
(45) Date of Patent: Oct. 20, 2015

(54) VIRTUAL PIVOT AXIS SPRING

(75) Inventor: Terje Rølvåg, Trondheim (NO)

(73) Assignee: COLICOT AS, Tonsberg (NO)

( * ) Notice: Subject to any disclaimer, the term of this patent is extended or adjusted under 35 U.S.C. 154(b) by 216 days.

(21) Appl. No.: 13/806,562

(22) PCT Filed: Jun. 24, 2011

(86) PCT No.: PCT/NO2011/000181
§ 371 (c)(1),
(2), (4) Date: Mar. 15, 2013

(87) PCT Pub. No.: WO2011/162619
PCT Pub. Date: Dec. 29, 2011

(65) Prior Publication Data
US 2013/0207426 A1    Aug. 15, 2013

Related U.S. Application Data

(60) Provisional application No. 61/358,661, filed on Jun. 25, 2010.

(30) Foreign Application Priority Data

Jun. 25, 2010   (GB) .................................. 1010739.9
Jun. 25, 2010   (NO) .................................. 20100927

(51) Int. Cl.
| | |
|---|---|
| *F16F 1/18* | (2006.01) |
| *F16F 1/02* | (2006.01) |
| *F16F 1/34* | (2006.01) |
| *A47C 3/021* | (2006.01) |
| *A47C 3/025* | (2006.01) |

(52) U.S. Cl.
CPC .................. *F16F 1/027* (2013.01); *A47C 3/021* (2013.01); *A47C 3/0252* (2013.01); *F16F 2230/34* (2013.01)

(58) Field of Classification Search
CPC ........... F16F 1/027; F16F 1/025; F16F 1/185; F16F 2230/34; A47C 3/021; A47C 3/0252
USPC .................. 297/181, 216.2, 258.1, 286, 285; 267/160, 133, 143, 161, 131
See application file for complete search history.

(56) References Cited

U.S. PATENT DOCUMENTS

| | | | | |
|---|---|---|---|---|
| 194,189 | A * | 8/1877 | Sweezy ......................... | 267/131 |
| 1,875,034 | A | 8/1932 | Larsen | |
| 2,006,422 | A * | 7/1935 | Trainor ......................... | 297/294 |

(Continued)

FOREIGN PATENT DOCUMENTS

| | | |
|---|---|---|
| CA | 511320 A | 3/1955 |
| CN | 201185383 Y | 1/2009 |

(Continued)

*Primary Examiner* — Milton Nelson, Jr.
(74) *Attorney, Agent, or Firm* — Birch, Stewart, Kolasch & Birch, LLP

(57) ABSTRACT

A spring includes a first, inner, continuous frame and a second, continuous frame enveloping the first frame. The first and second frames is made of a flexible material of high yield stress. The first and second frame have a common frame portion constituting a minor proportion of the first frame compared to the remainder of the first frame. The first and second frames are plane arranged generally in a common plane in their unloaded state and arranged for being deformed generally in the common plane.

22 Claims, 9 Drawing Sheets

(56) References Cited

U.S. PATENT DOCUMENTS

| | | | | |
|---|---|---|---|---|
| 2,084,310 | A * | 6/1937 | Breuer | 297/295 |
| 2,678,685 | A * | 5/1954 | Volsk | 267/144 |
| 3,063,670 | A * | 11/1962 | Young | 267/140.5 |
| 3,536,315 | A * | 10/1970 | Jenkin | 267/161 |
| 3,618,144 | A | 11/1971 | Frey et al. | |
| 4,595,236 | A | 6/1986 | Rizzoli | |
| 4,736,932 | A | 4/1988 | Haslim | |
| 4,971,394 | A | 11/1990 | Vanderminden | |
| 5,154,485 | A * | 10/1992 | Fleishman | 297/446.1 |
| 5,226,634 | A | 7/1993 | Rudy, Jr. et al. | |
| 6,702,082 | B2 * | 3/2004 | Dorfler et al. | 192/70.18 |
| 6,913,317 | B2 | 7/2005 | Vanderminden et al. | |
| 2008/0191399 | A1 * | 8/2008 | Chang | 267/161 |
| 2008/0258530 | A1 | 10/2008 | Link | |
| 2010/0059653 | A1 | 3/2010 | Chen et al. | |
| 2010/0145510 | A1 * | 6/2010 | Ihrke et al. | 700/245 |

FOREIGN PATENT DOCUMENTS

| | | |
|---|---|---|
| DE | 29704906 U1 | 5/1997 |
| EP | 1153558 A2 | 11/2001 |
| EP | 1716790 A1 | 11/2006 |
| GB | 632456 | 10/1948 |
| IT | 1179672 | 9/1987 |
| WO | WO 2005/055769 A2 | 6/2005 |
| WO | WO 2008/094865 A1 | 8/2008 |

* cited by examiner

VIRTUAL PIVOT AXIS SPRING

CROSS REFERENCE TO RELATED APPLICATIONS

This application is the National Phase of PCT/NO2011/000181 filed on Jun. 24, 2011, which claims priority under 35 U.S.C. §119(e) to U.S. Provisional Application No. 61/358,661 filed on Jun. 25, 2010 and under 35 U.S.C. §119(a) to Patent Application Nos. 1010739.9 filed in the United Kingdom on Jun. 25, 2010 and 20100927 filed in Norway on Jun. 25, 2010, all of which are hereby expressly incorporated by reference into the present application.

INTRODUCTION

The present invention relates to a spring. More specifically, the invention is mainly a plane spring comprising an inner frame and an enveloping frame both made in a flexible or resilient material of high yield stress and a large deformation capacity, and with a rather short common frame portion compared to the remainder of said first frame. In an embodiment of the invention such springs are used in office chairs, but may also be used for other devices such as wheel suspensions of vehicles, cradles, babycarriages, beds, sports and fitness equipment, and other appliances.

BACKGROUND ART

Springs are widely used in various embodiments of chairs. As an example, an office chair with a tilting seat supported by a multi-part spring mechanism is presented in the international patent application published as WO2008/094865. An adjustably tilting seat of a chair is presented in US2008/0258530 and comprises a multitude of parts.

Problems Related to the Background Art

Spring arrangements in office chair structural support mechanisms are complex and contain a large number of springs, axles, washers, steel plate frames, link arms, lock pins, adjustment levers, release levers and position adjustment screws and adjusting wheels. The spring arrangement is usually pre-tensioned and so difficult to assemble that the assembly must be conducted at the production site. Thus the chair must be generally completely assembled at the production site and thus transported to the vendor or customer in a voluminous box. This increases the transport price which is usually calculated based on volume and not on weight, and further this maintains high boxing costs.

Further, due to the complexity of office chair structural support spring mechanisms, building a mechanical prototype may take 3 to 4 weeks. It is desirable to reduce the prototyping time significantly.

A survey made by Swizz in 1992 indicated that the human body would benefit from chairs which support the user in a wide and varied range of positions related to the work tasks to be conducted while sitting in the chair, and that the user should be offered to vary his position in order to reduce his physical strain.

Chair spring mechanisms of the background art easily get worn and, if tensioned hard, usually get noisy. A worn spring mechanism usually loses its resilient properties and requires more force to straighten up the chair than to bend down during loading. Occasionally office chair spring mechanisms lose parts when worn.

Boat seat structural support mechanisms also require a flexible suspension of the seat, and in addition to the problems related to office chair support spring mechanisms they are subject to corrosion due to the salt in sea water spray intruding the mechanism which incurs accelerated deterioration.

Plane spring or torsion spring assemblies usually have a fixed and known pivot point within the geometrical extent of the spring. It would be desirable to have a spring which could have its pivot point relatively far offset from the spring's body, such as for the wheel suspension of vehicles, in order for such a vehicle to have improved suspension characteristics.

Solution Presented by the Invention

A solution related to the described background art problems is thus herein further presented. The solution represented by a first independent claim is a spring, comprising
  a first, inner, continuous frame (1),
  a second, continuous frame (2) enveloping said first frame (1),
  said first and second frames (1, 2) made in a flexible material of high yield stress,
  said first and second frame having a common frame portion (12) constituting a minor proportion of said first frame (1) compared to the remainder of said first frame (1),
  said first and second frames (1, 2) being plane arranged generally in a common plane (P) in their unloaded state and arranged for being deformed generally in said common plane (P).

In the spring of the invention the first and second frames (1, 2) may be arranged for being connected to and thus loaded by first and second torsional moment components ($\tau 1$, $\tau 2$), respectively, normal to said common plane (P). Further, the first and second frames (1, 2) may be arranged for being loaded by first and second force components (F1, F2), respectively, in the common plane (P). Thus the spring of the invention may provide a coupled combined pivoting and translatory motion. The flexible material used in said first and second frames (1, 2) may also be resilient.

Advantageous embodiments of the invention are defined in the attached further dependent claims.

Advantages of the Invention

Used as a component in a chair, embodiments of the invention have several advantages.

First, springs according to the invention provide dynamic and pleasant sitting positions, as the seat may be moved and tilted in a coupled and continuous 3D motion about a so-called virtual pivot point. The position of the virtual pivot point may be controlled in the design and manufacture process. A pivot point at the spring centre, at the knee, near or above the head of the user, may be controlled during manufacture or during chair assembly.

Second, the spring according to the invention, which may comprise one single material component in its simplest embodiment, is extremely simple to design and manufacture compared to complex chair spring mechanisms of the background art. The spring of the invention may be manufactured in one flat, lean piece and transported as such, and may be easily assembled at the vendor's site or by the user. There is no maintenance of the spring, and if it has to be replaced or changed, this is an easy disassembly/reassembly operation which may be conducted nearly by any person.

Thirdly, a one-component spring mechanism without any internal links, wherein the entire deformation of the spring mechanism occurs internally within the single part spring without any joints, will most probably not incur any noise nor any external friction, only generation of insignificant heat.

Fourthly, the stiffness required for a spring mechanism according to the invention may be adjusted by the thickness or general geometry of the spring. The stiffness required for a spring mechanism may additionally or alternatively be adjusted by stacking a number of springs.

Further, a spring according to the invention may advantageously constitute an armrest of simple and rather elegant design.

BRIEF FIGURE CAPTIONS

The invention is illustrated in the accompanying drawings.

FIG. 4 comprises illustrations of an embodiment of the invention used with a strongly simplified "office chair" with the seat mounted in two side frame embodiments of the spring of the present invention. The springs here also act as right and left armrests.

Figure 4A:
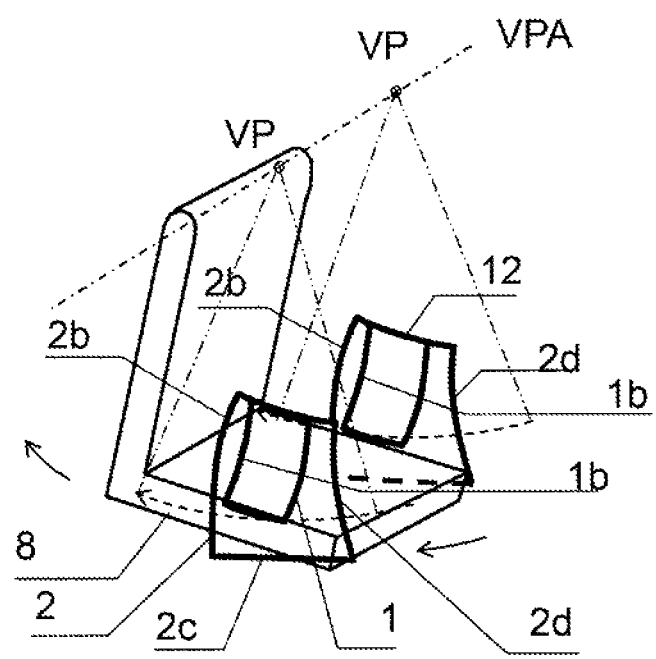

FIG. 4a shows the chair with the seat pushed rearwards and thus inclined forwards due to the mechanical properties of the spring geometry.

Figures 4B, 4D:
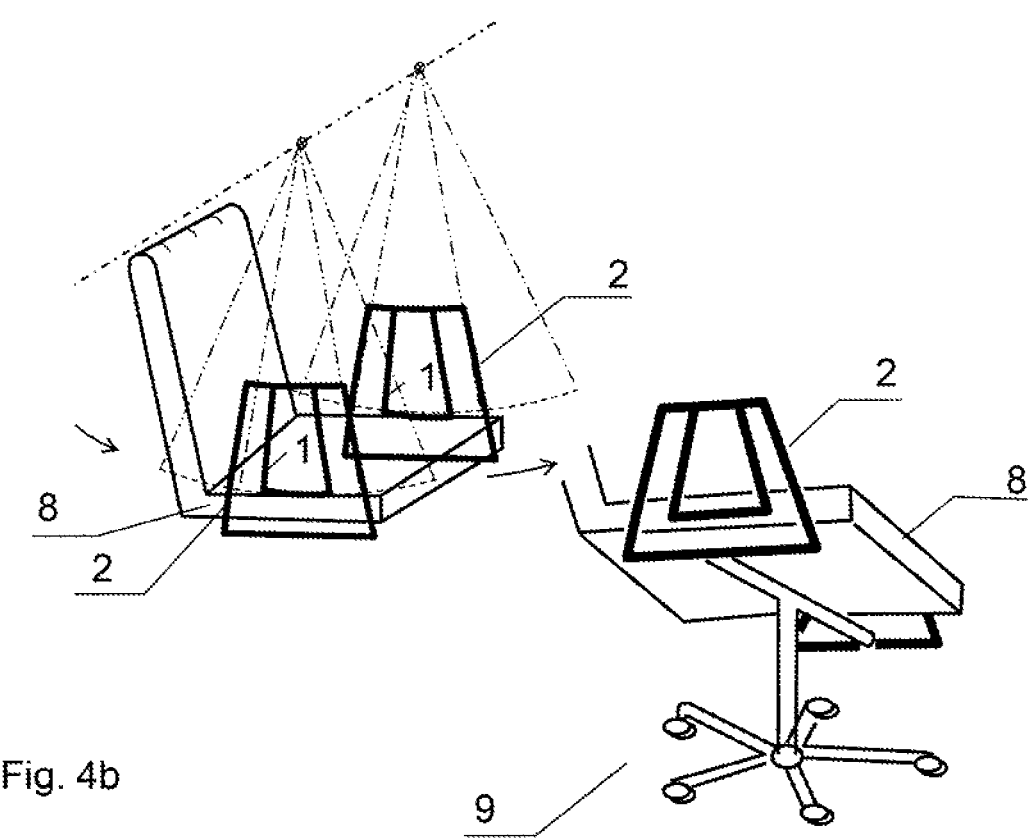

FIG. 4b illustrates the simplified chair with the spring according to the invention in its unloaded or neutral position.

Figure 4C:
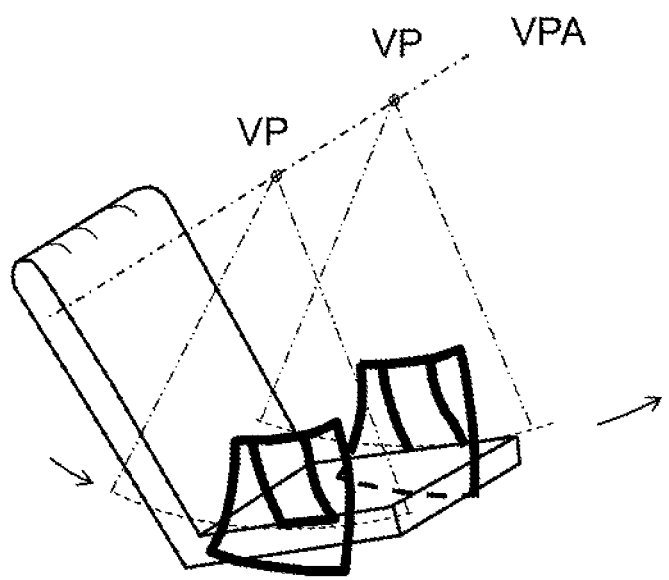

FIG. 4c illustrates the simplified chair with seat pushed forward, and inclined backward due to the springs' properties.

FIG. 4d is a perspective view of the chair with the springs mounted as side frames according to the invention, with the outer frame of each spring mounted to a rigid T-shaped support structure with a wheel base.

Figure 5:
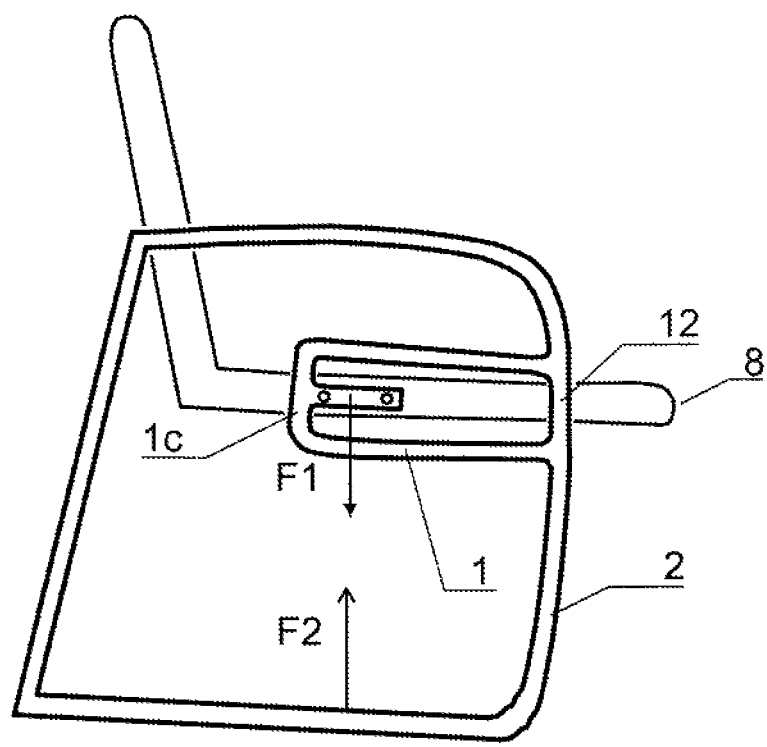

FIG. 5 illustrates a side elevation view of a chair with a spring according to the invention. The chair is supported in the spring in a different orientation compared to the orientation of the spring in FIG. 4. Here the chair is supported on a short beam on the far side of the common beam portion of the two frames, and the enveloping or outer frame is supported with a "lateral" beam resting flat on the floor. In this manner a pivot point of the chair may end up within the spring, or in front of the common beam portion.

Figure 6:
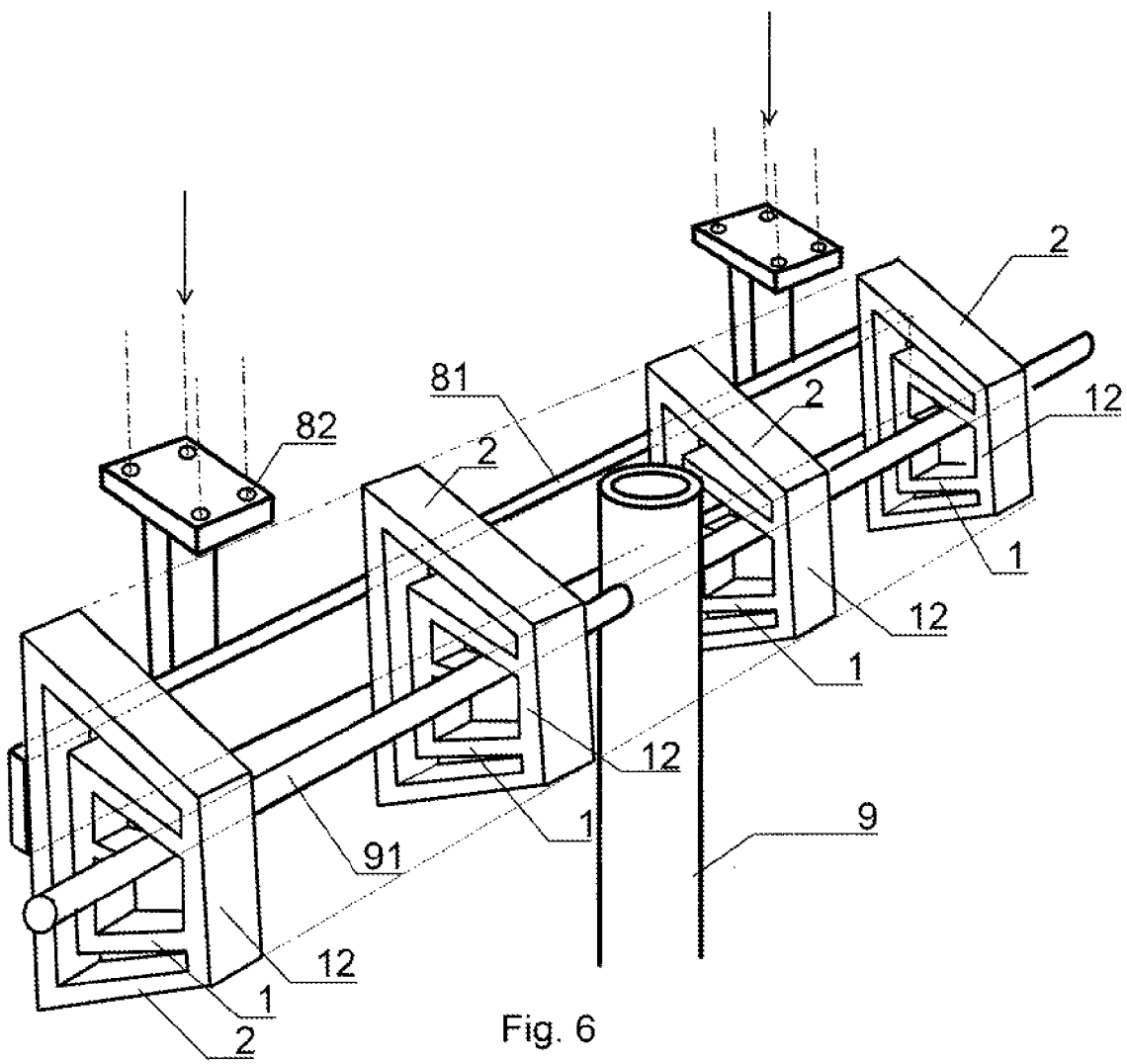

FIG. 6 is a perspective view of an embodiment of the invention with a laterally arranged stack of springs arranged with their inner frames arranged on a common rigid rod fixed on a chair support, and their outer frames arranged on a common rigid rail holding seat supports on their top surface. The entire structure may be arranged more or less hidden below the seat.

Figure 7:
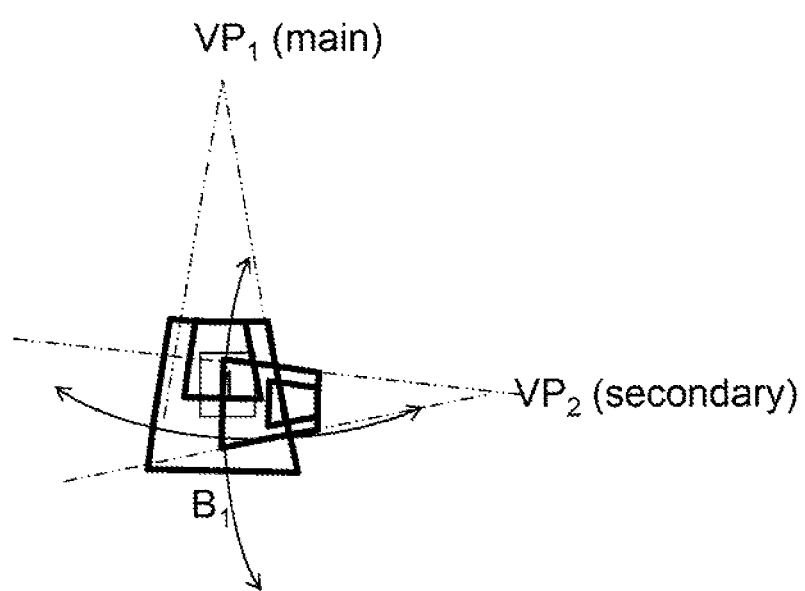

FIG. 7 is a simple illustration of springs connected working in serial, such as for allowing a combined movement about two pivot points.

EMBODIMENTS OF THE INVENTION

The invention is a spring illustrated in several different embodiments and combinations in the attached drawings.

The invention is a spring characterized by a first, inner, continuous frame (1), connected with a second, continuous frame (2) enveloping said first frame (1). The connection between the first and second frames (1, 2) occurs via a common frame portion (12) constituting a minor proportion of the first frame (1) compared to the remainder of said first frame (1). The first and second frames (1, 2) generally are plane and arranged generally in a common plane (P) in their unloaded state. The first and second frames (1, 2) are arranged for mainly being deformed in the common plane.

The flexing of the spring in the plane may is now described, please see the transition from the neutral position of a spring in FIG. 4b, with a rotational and translational movement in a first direction, here rearwards and about a pivot point above the chair, as illustrated in FIG. 4a, and to an opposite side in FIG. 4c; the leading beam (1b) of the first, inner frame (1), and also the trailing beam (1d) in this rearwards movement are bent concavely relative to the direction of deformation. Leading and trailing beams (1b, 1d) transfer the bending moment to the common frame portion (12) which transfers the moment to corresponding leading and trailing beams (2b, 2d) of the second, outer frame (2), which will then bend oppositely relative to their corresponding beams (1b, 1d) of the inner frame. The leading and trailing beams (2b, 2d) of the second, outer beam will have a convex face in the direction of deformation. Thus the first, inner and second, outer frame (1, 2) seem to bend in oppositely diverging arches. In some geometrical configurations the pivot point may be controlled during manufacture to reside outside the perimeter of the second, outer frame, as shown in this example.

Figure 1:
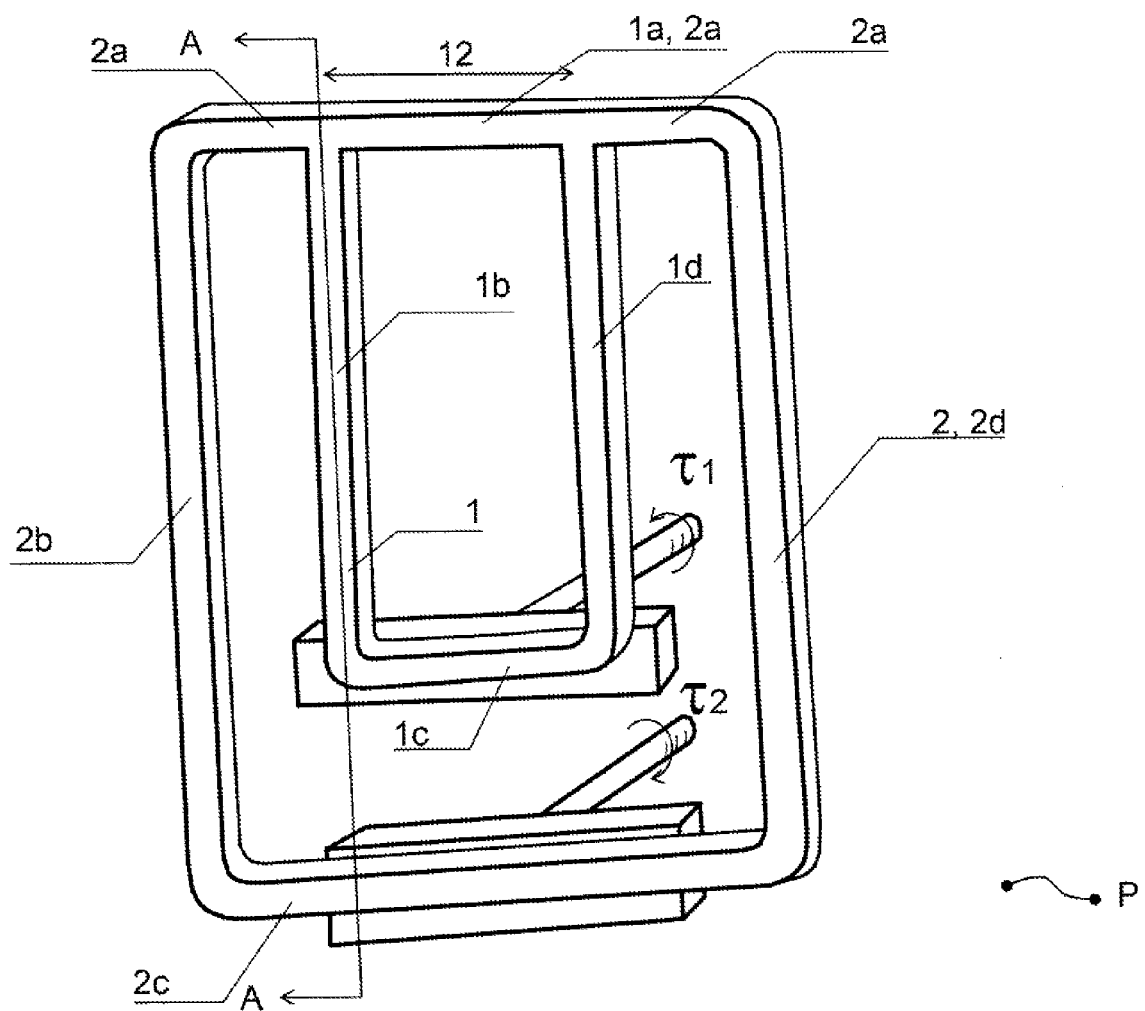
FIG. 1 is a perspective view of a spring according to the invention comprising two interconnected elastic frames, each frame connected to one of a pair of torsional moments. The torsion moment vectors are generally perpendicular to the common plane of the two frames parts of the spring.
Figure 2:
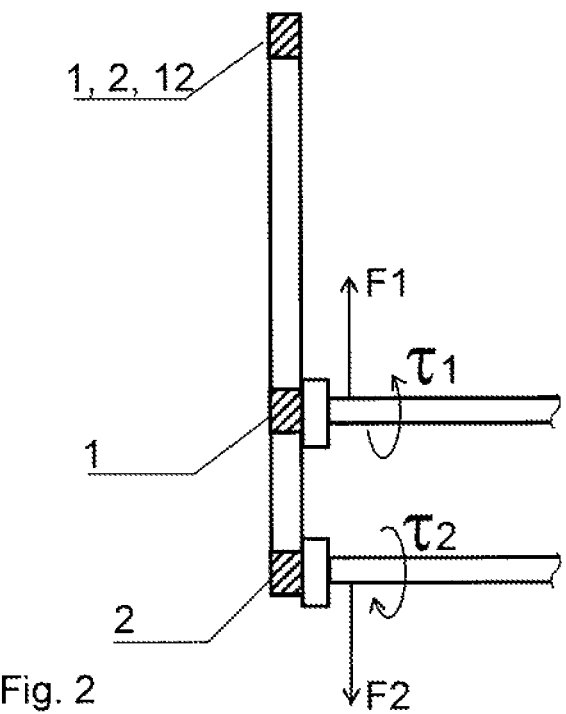
FIG. 2 is a partial elevation view and a cross-section through the spring through A-A in FIG. 1, showing connected rigid members connected to the spring.

In the spring of the invention should, in order to utilize most of the flexibility of the active lengths of the first and second frames (1, 2), the first and second frames (1, 2) should be connected far from the common frame portion (12). Thus, in the examples illustrated particularly in FIG. 1 and in FIG. 4, the inner and outer frames are arranged for being loaded by first and second torsional moment components ($\tau 1$, $\tau 2$), respectively, normal to said common plane (P), and the first and second torsional moments are connected to the frames at their sides being opposite to the common frame portion (12). Such torsional moments may dominate in the embodiment illustrated in FIGS. 4a, b, c, and d.

By the term connected we mean that the first frame (1) shall be rigidly connected to some mechanical structure providing the a first moment or translatory force, such as a seat of a chair, and the second frame (2) may be rigidly connected to a rigid, supporting structure such as for an office chair.

The spring of the invention may also take up forces (F1, F2) such as translational forces in the common plane (P). Such translational forces will certainly arise in the embodiment illustrated in FIG. 5 wherein the common frame portion (12) is arranged in front of the chair frame spring component frame (2). Such an arrangement of an outer frame may further be supported on an office chair structural support, and in both cases the user will experience both a downwards translation while sitting down, and a rotational movement hinged approximately about her knees.

In an embodiment of the spring the flexible material used in the first and second frames (1, 2) is also resilient, i.e. when unloaded, the material returns nearly all the energy used for deforming it.

The spring according to the invention may be entirely or partly arcuate such as illustrated in FIG. 5, or comprise straight beam portions. In an embodiment of the invention the first frame (1) is polygonal comprising first beams (1a, 1b, 1c, 1d, . . . ). In a preferred embodiment as illustrated in FIGS. 1, 3, 4, and 6, the beams (which generally are in a continuous material piece) are generally straight. The number of the beams (1a, 1b, 1c, 1d, ...) in the first frame (1) may be four as illustrated.

The same holds for the second or outer frame (2), which may be polygonal comprising second beams (2a, 2b, 2c, 2d, ...). Further, the number of beams (2a, 2b, 2c, 2d, ...) in the second frame (2) may be four, also as illustrated.

The numbering of the beams may be made such that the common frame portion (12) constituted by said first beam (1a). The first beam (1a) may form an intermediate portion of the second beam (2a) as generally illustrated.

Figure 3:
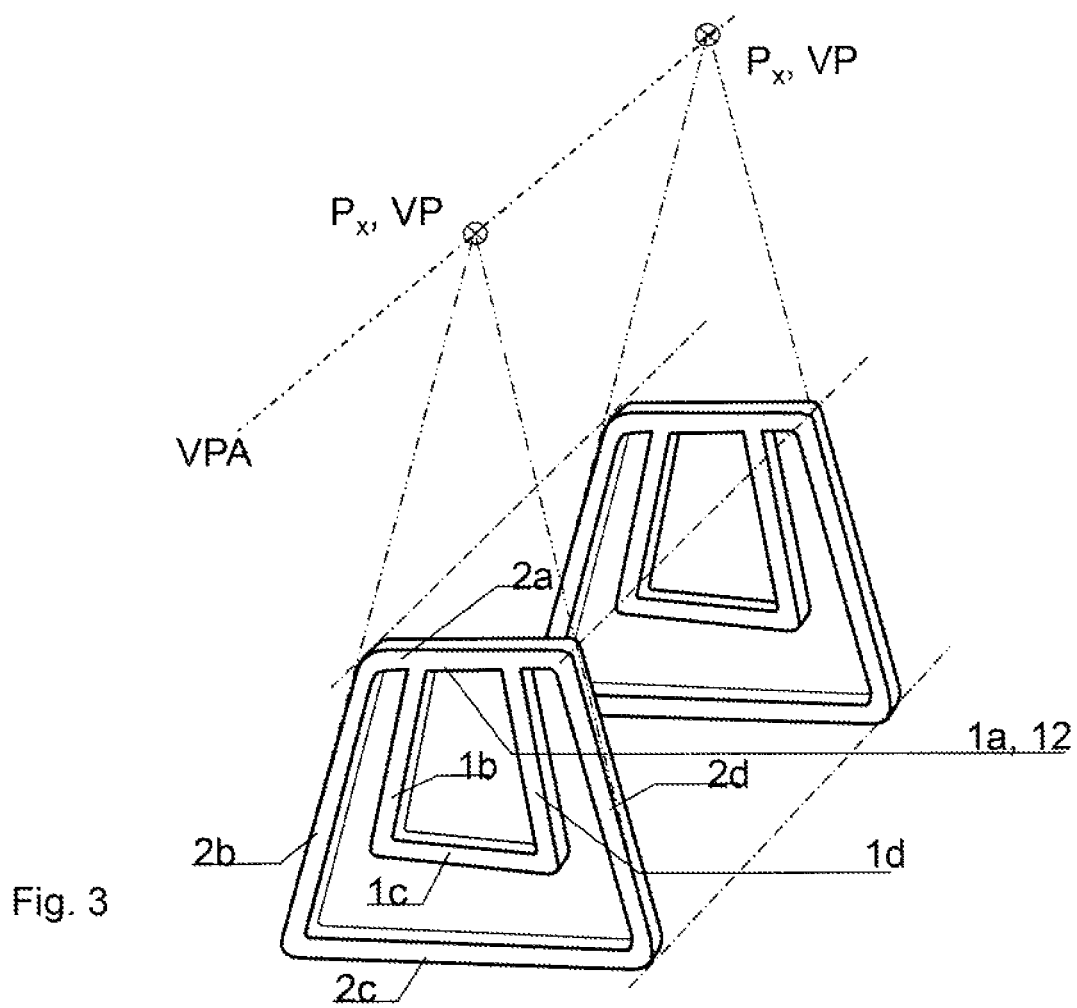
FIG. 3 is a perspective view of two parallel springs according to the invention, with so-called virtual pivot points VP, here arranged along a common transverse axis VPA.

In some embodiments of the invention the first frame (1) and the second frames (1, 2) are trapezoids, of which the first beam (1a) of the first frame (1) and the first beam (2a) of the second frame (2) constitute shorter beams than corresponding opposite beams (1c, 2c) of each frame (1, 2). This is illustrated in FIGS. 3 and 4. The resulting and with non-parallel beams (1b, 1d) of the first frame (1) and non-parallel beams (2b, 2d) of the second frame (2) are directed towards near a common intersection point (Px). This common intersection point will be at or near the pivot point of the spring and may be called a virtual pivot point (VP) of the spring, please see FIG. 3. The pivot points of parallelly arranged springs of the invention may be called a virtual pivot point axis, (VPA). Having a virtual pivot point outside the perimeter of the outer frame may be advantageous in case a rotational movement is required about a desired location of axis which may not be available due to being occupied by other parts of e.g. a vehicle, or where the desired pivot axis is outside the vehicle itself. Please be aware of the term trapezoid, which is defined here as a quadrilateral having four sides of any size, of which two opposite of the four sides may be parallel or non-parallel.

In the embodiments illustrated in FIG. 4, the common intersection point (Px) and said virtual pivot point (VP) are arranged above the spring in the simply illustrated chair.

In an other embodiment of the spring of the invention the common intersection point (Px) and said virtual pivot point (VP) may be arranged near the elevation of the first frame (1), please see FIG. 5.

In still an other embodiment the common intersection point (Px) and said virtual pivot point (VP) may preferably be arranged below said spring. Examples of such arrangements of the pivot point may be useful for a cradle or in a kindergarten apparatus, with some kind of seat or saddle on one or more springs.

The spring may be supported on a substructure without any fixing means, such as for the chair illustrated in FIG. 5. However, in several embodiments of the invention the spring should be rigidly supported.

In an embodiment of the invention the first frame (1) is coupled to a seat structure (8), such as illustrated in FIG. 4d, and the second frame (2) is connected to a supporting, generally rigid chassis (9). In FIGS. 4d and in FIG. 6 this chassis may be the vertical rod (9) of the wheel base of an office chair, and a T-bar (91) connected to the vertical rod (9).

In embodiments of the invention the spring may further be laterally combined; two or more of the first frames (1) may be laterally stacked and coupled to the support structure (9) via a common rod (91). Similarly, two or more of the corresponding second frames (2) may be coupled to a common rail (81) with brackets (82) for holding a seat (8). Please see the chair of FIG. 4, and a sub-seat spring assembly as shown in FIG. 6.

The rigid chassis (9) may be a chair frame for standing on said floor or for being attached to a wall. Examples of such chassis may be as above, an office chair support frame on wheels, or a boat chair lateral support frame extending laterally from under the seat to a wall.

As mentioned above, the first frame (1) may in an embodiment of the invention be coupled to a seat structure (8), said second frame (2) stably supported on a substrate such as a floor, please see an example of the ordinarily looking side elevation of the ordinarily looking chair of FIG. 5.

With regard to the material of the spring of the invention the first and second frames (1, 2, 12) may be made in a resilient steel, titanium or other metal, a polymer plastic material such as polyamide, polyethylene, nylon, which may provide flexibility but less resilience than metal springs, or solid or laminated wood. The spring should be dimensioned according to the material properties and desired degree of flexibility and resilience, and to the loading forces and moments.

The spring of the invention may be made in several ways. It may be manufactured from an extruding rod having a cross-section with the desired spring plane geometry, whereby the so extruded profile is cut in slabs of desired thickness to form the spring. The spring may be manufactured by cutting or otherwise machining the spring from a slab of desired material quality, or by moulding.

Similar to the generally trapezoidal spring illustrated in FIGS. 3 and 4 with the first beams (1a, 2a) of the frames (1, 2) being shorter than the common beam portion (12), this may be arranged oppositely, as shown in FIG. 6, wherein the first beam (1a) of said first frame (1) and said first beam (2a) of said second frame (2) constitute longer beams than corresponding opposite beams (1c, 2c) of each frame (1, 2). Here, the non-parallel beams (1b, 1d) of the first frame (1) and the non-parallel beams (2b, 2d) of the second frame (2) are directed towards near a common intersection point so as for forming a "virtual" pivot point axis of the springs which here may reside beyond the surface of the common frame portions (12), i.e. in the right, front portion of FIG. 6.

For some uses of the spring according to the invention, with or without a "virtual pivot axis", springs may be connected working in serial: a first or a second frame (1, 2) may be further connected to a first or a second frame (1, 2) of a spring of the same type in order to allow a combined movement about two pivot points (VP1, VP2), please see FIG. 7.

One may wish to manufacture a flat spring according to the invention with a particular beam geometry in order to control the position of the pivot point outside the frame, such as illustrated in FIG. 3. The part of the spring which shall reside towards the desired pivot point position is selected to be the common beam portion (12) with the first beams (1a, 2a) of the first and second quadrilateral frames. The first beam (1a) of the first frame (1) is connected to second and third beams (1b, 1d) further connected to a fourth beam (1c) opposite of said first beam (1a), together generally forming a first trapezoid. The corresponding first beam (2a) of the second frame (2) is connected to second and third beams (2b, 2d) which are further connected to a fourth beam (2c) opposite of said first beam (2a), together generally forming a second trapezoid. Then the geometry is controlled by letting two of the non-parallel beams (1b, 1d) of the first frame (1) and two of the non-parallel beams (2b, 2d) of the second frame (2) be directed towards near a common intersection point (Px), so as for forming the virtual pivot point (VP) of said spring at the desired location.

The reader will realize that for the geometry of the springs of FIG. 6 the virtual pivot point will also end up outside the second, outer frame outside the side of the common beam portion (12).

The mechanical and structural features described above or shown in the drawings are not to be construed as separate embodiments of the invention which cannot be combined, but may be combined in embodiments of the invention according to the desire of the mechanical designer.

Springs according to the invention may be given an opposite geometry so as for arranging the virtual pivot point outside the opposite side relative to the common beam portion.

The invention claimed is:

1. A spring comprising:
a first, inner, continuous frame;
a second, continuous frame enveloping said first frame;
said first and second frames made in a flexible material of high yield stress;
said first and second frame having a common frame portion constituting a minor proportion of said first frame compared to the remainder of said first frame;
said first and second frames being plane and arranged generally in a common plane in their unloaded state and arranged for being deformed generally in said common plane; and
said first and second frames for being loaded by first and second torsional moment components, respectively, perpendicular to said common plane.

2. The spring of claim 1, said first and second frames arranged for being loaded by first and second force components, respectively, in said common plane.

3. The spring of claim 1, the flexible material used in said first and second frames also being resilient.

4. A chair with a spring of claim 1, said first frame coupled to a seat structure, said second frame arranged for being stably supported by a floor.

5. The spring of claim 1, said first and second frames made in a resilient steel, titanium or other metal, a polymer plastic material or solid or laminated wood.

6. The spring of claim 1, said spring manufactured from an extruding rod having a cross-section with a desired spring plane geometry, said extruded rod cut in slabs of desired thickness to faun said spring.

7. The spring of claim 1, said spring manufactured by machining the spring for a slab of desired material quality.

8. The spring of claim 1, said spring manufactured by moulding.

9. The spring of claim 1, said second frame being polygonal comprising second beams.

10. The spring of claim 9, the number of beams in said second frame being four.

11. A chair with a seat structure coupled to said first frame of the spring of claim 1, said second frame connected to a supporting generally rigid chassis.

12. The chair of claim 11, two or more of said first frames laterally stacked and coupled to said supporting generally rigid chassis via a common rod, and two or more of corresponding said second frames coupled to a common rail with brackets for holding a seat.

13. The chair of claim 11, said rigid chassis being a chair frame for standing on a floor or for being attached to a wall.

14. The spring of claim 1, said first frame being polygonal comprising first beams.

15. The spring of claim 14, said common frame portion constituted by said first beam.

16. The spring of claim 15, said first beam forming an intermediate portion of said second beam.

17. The spring of claim 14, the number of said beams in said first frame being four.

18. The spring of claim 17, said first frame and said second frame being trapezoids, of which said first beam of said first frame and said first beam of said second frame constitute longer beams than corresponding opposite beams of each frame, and with non-parallel beams of said first frame and non-parallel beams of said second frame directed towards a common intersection point, for forming a virtual pivot point of said spring.

19. The spring of claim 17, said first frame and said second frame being trapezoids, of which said first beam of said first frame and a first beam of said second frame constitute shorter beams than corresponding opposite beams of each frame, and provided with first non-parallel beams of said first frame connecting said first beam to said first opposite beam, and provided with second non-parallel beams of said second frame connecting said second beam to said second opposite beam, and wherein said first non-parallel beams of said first frame and said second non-parallel beams of said second frame are directed towards a common intersection point, to form a virtual pivot point of said spring.

20. The spring of claim 19, said common intersection point and said virtual pivot point arranged above said spring.

21. The spring of claim 19, said common intersection point and said virtual pivot point arranged near an elevation of said first frame of said spring.

22. The spring of claim 19, said common intersection point and said virtual pivot point arranged below said spring.

* * * * *